(12) United States Patent
Gonnsen et al.

(10) Patent No.: US 8,360,363 B2
(45) Date of Patent: Jan. 29, 2013

(54) FLOOR STRUCTURE IN AN AIRCRAFT WITH CONTINUOUS PANELS

(75) Inventors: Johannes Gonnsen, Hamburg (DE); Manfred Kook, Hamburg (DE); Markus Fokken, Hamburg (DE); Michael Dupont, Hamburg (DE); Norbert Möllers, Buxtehude (DE); Ralf Schliwa, Dollern (DE)

(73) Assignee: Airbus Operations GmbH (DE)

( * ) Notice: Subject to any disclaimer, the term of this patent is extended or adjusted under 35 U.S.C. 154(b) by 727 days.

(21) Appl. No.: 12/223,844

(22) PCT Filed: Feb. 8, 2007

(86) PCT No.: PCT/EP2007/001084
§ 371 (c)(1),
(2), (4) Date: Dec. 2, 2009

(87) PCT Pub. No.: WO2007/093322
PCT Pub. Date: Aug. 23, 2007

(65) Prior Publication Data
US 2010/0065681 A1    Mar. 18, 2010

Related U.S. Application Data

(60) Provisional application No. 60/774,342, filed on Feb. 17, 2006.

(30) Foreign Application Priority Data

Feb. 17, 2006    (DE) .......................... 10 2006 007 469

(51) Int. Cl.
*B64D 11/00*    (2006.01)
(52) U.S. Cl. ................ 244/118.5; 244/118.1; 52/506.04

(58) Field of Classification Search ............... 244/118.5, 244/118.6, 118.1, 131; 248/503.1; 52/506.04, 52/506.05, 506.07, 506.08, 506.09, 506.1
See application file for complete search history.

(56) References Cited

U.S. PATENT DOCUMENTS

| | | | |
|---|---|---|---|
| 3,396,678 A * | 8/1968 | Jensen ..................... | 248/346.02 |
| 3,452,958 A * | 7/1969 | Hambleton .............. | 248/346.02 |
| 3,478,995 A * | 11/1969 | Lautzenhiser et al. ........ | 410/104 |
| 3,652,050 A * | 3/1972 | Marrujo et al. .............. | 248/429 |
| 3,893,729 A * | 7/1975 | Sherman et al. ............. | 297/118 |
| 3,938,764 A * | 2/1976 | McIntyre et al. ......... | 244/117 R |

(Continued)

FOREIGN PATENT DOCUMENTS

| | | |
|---|---|---|
| EP | 1495946 | 1/2005 |
| FR | 2728860 | 7/1996 |

(Continued)

OTHER PUBLICATIONS

Zhitomirsky, Russian Journal, 6 pages (1991). (English translation of abstract only.).

*Primary Examiner* — Christopher P Ellis
(74) *Attorney, Agent, or Firm* — Lerner, David, Littenberg, Krumholz & Mentlik, LLP

(57) ABSTRACT

A floor structure in an aircraft includes a plurality of seat rails that extend parallel in relation to each other, and at least one floor panel. The floor panel extends over the seat rails and rests on the individual seat rails. In order to be able to fasten interior equipment components to the seat rails situated underneath the floor panels, the at least one floor panel includes a plurality of through-holes through which the interior equipment components of the aircraft can be locked into place on the seat rails.

10 Claims, 4 Drawing Sheets

U.S. PATENT DOCUMENTS

| | | | |
|---|---|---|---|
| 4,185,799 A * | 1/1980 | Richards, Jr. | 244/118.5 |
| 4,577,450 A | 3/1986 | Large | |
| 5,383,630 A | 1/1995 | Flatten | |
| 6,302,358 B1 * | 10/2001 | Emsters et al. | 244/137.1 |
| 6,514,021 B2 * | 2/2003 | Delay | 410/90 |
| 6,659,402 B1 * | 12/2003 | Prochaska | 244/118.6 |
| 6,875,916 B2 * | 4/2005 | Winkelbach et al. | 174/482 |
| 7,143,989 B2 * | 12/2006 | Looker | 248/346.02 |
| 7,172,155 B2 * | 2/2007 | Feist et al. | 244/118.6 |
| 7,188,805 B2 * | 3/2007 | Henley et al. | 244/118.5 |
| 7,207,523 B2 * | 4/2007 | Callahan et al. | 244/118.6 |
| 7,607,613 B2 * | 10/2009 | Frantz et al. | 244/118.6 |
| 7,618,009 B2 * | 11/2009 | Glockler | 244/118.1 |
| 7,857,259 B2 * | 12/2010 | Baatz et al. | 244/122 R |
| 2005/0224648 A1 | 10/2005 | Grether et al. | |
| 2005/0224650 A1 | 10/2005 | Reed et al. | |
| 2006/0049311 A1 * | 3/2006 | Callahan et al. | 244/118.6 |
| 2007/0080258 A1 * | 4/2007 | Baatz et al. | 244/118.6 |
| 2007/0164156 A1 * | 7/2007 | Henley et al. | 244/118.5 |
| 2008/0017755 A1 * | 1/2008 | Kennedy et al. | 244/118.5 |
| 2009/0014584 A1 * | 1/2009 | Rudduck et al. | 244/118.6 |
| 2010/0108808 A1 * | 5/2010 | Allain et al. | 244/118.6 |
| 2010/0314495 A1 * | 12/2010 | Dazet et al. | 244/131 |
| 2011/0068226 A1 * | 3/2011 | Baatz et al. | 244/118.6 |

FOREIGN PATENT DOCUMENTS

| | | |
|---|---|---|
| GB | 706614 | 3/1954 |
| GB | 2353769 | 3/2001 |
| JP | 04-151399 A | 5/1992 |
| RU | 33926 U1 | 7/2003 |
| RU | 37688 U1 | 5/2004 |
| WO | 84/04948 | 12/1984 |

* cited by examiner

FLOOR STRUCTURE IN AN AIRCRAFT WITH CONTINUOUS PANELS

REFERENCE TO RELATED APPLICATIONS

This application claims the benefit of the filing date of German Patent Application No. 10 2006 007 469.6 filed Feb. 17, 2006 and of U.S. Provisional Patent Application No. 60/774,342 filed Feb. 17, 2006, the disclosure of which applications is hereby incorporated herein by reference.

TECHNICAL FIELD

The present invention generally relates to the technical field of structure and equipment installation in an aircraft. In particular, the invention relates to a floor structure in an aircraft with floor panels that extend over the seat rails. Furthermore, the invention relates to an aircraft that at least in sections comprises the floor structure according to the invention.

BACKGROUND OF THE INVENTION

Usually, the structure of the floor in a large-capacity passenger aircraft is designed such that the frames that constitute the fuselage are horizontally spanned, in a tendon-like manner, by transverse girders onto which the actual floor structure is built. In this arrangement seat rails that extend in longitudinal direction of the fuselage, mostly in pairs, are arranged on the transverse girders, in which seat rails, the seats or seat rows as well as other interior equipment components such as for example galleys, stowage areas, lavatories, personnel work stations, entertainment control centres or class dividers can later be anchored, with the above, within the context of the present invention, being designated by the overall term of interior equipment components. In this arrangement floor panels are fitted strap-like as a floor covering between the individual seat rails, wherein, if required, said floor panels can also be made rigid by way of additional optional transverse girders between the seat rails if relatively heavy interior equipment components such as for example galleys or lavatories are to be placed onto the floor panels.

As an alternative to this, floor panels that are internally reinforced with carrier-like reinforcement elements are also known as a floor covering. However, these floor panels also only extend between two adjacent seat rails by way of which they support the loads to be transferred as single-field supports.

The described known floor structure has been shown to be disadvantageous in particular in the area of interior equipment components, in particular in wet areas as formed by lavatories or galleys, because in those areas the seat rails that extend through the wet area have to be elaborately sealed off from the floor panels bordering the seat rails. Since such sealing has to be carried out already during structural and equipment installation, at this early installation stage the exact positions of such wet areas, for example galleys or lavatories, must already be known, so that subsequent customer requirements or necessary modifications to the position of interior equipment can no longer be catered for. Furthermore, as a result of the required sealing of the known floor structure, a plurality of small parts have to be kept at hand, which can be disadvantageous in particular as far as logistics are concerned.

PRESENTATION OF THE INVENTION

Based on the disadvantages and problems associated with the known floor structure described above, it is an object of the present invention to provide a floor structure which requires little sealing effort and which makes it possible to accommodate subsequent customer requirements or necessary modifications in relation to the position of interior equipment components such as for example galleys or lavatories.

This object may be met by a floor structure in an aircraft, which floor structure comprises a multitude of seat rails that extend parallel in relation to each other and that rest on the transverse girders that span the individual frames of the aircraft in a chord-like manner. Moreover, the floor structure comprises at least one floor panel as a floor covering, which floor panel covers the multitude of seat rails so that said floor panel rests on the individual seat rails of the multitude of seat rails. In this arrangement the floor panel can rest on the seat rails either directly or indirectly by way of any intermediate layers or intermediate supports. Since the seat rails are thus covered by the floor panel, and consequently the fastening means of the seat rails, which fastening means are provided for locking down interior equipment components, are covered up, the at least one floor panel comprises a plurality of through-holes through which the interior equipment components of the aircraft can be locked into place in or on the seat rails. In this arrangement the through-holes in the floor panel are at those positions in which the seat rails in the usual manner comprise a plurality of fastening means spaced apart from each other at even spacing so that the interior equipment components such as for example galleys or lavatories can be anchored, through the through-holes in the floor panel, to the fastening means of the seat rails situated underneath the floor panel.

This design of the floor structure according to the invention, in which the at least one floor panel in a static sense extends as a continuous panel over the multitude of seat rails and rests on said seat rails, is advantageous in that the individual floor panels no longer need to be sealed off, at the location of the joints, from the seat rails. Since there is thus no longer any sealing expenditure while the floor structure, due to its construction, is nevertheless sealed in relation to the seat rails, the cabin configuration can be altered at any time, which makes it possible to flexibly react to customer wishes or to modifications required for some other reasons, as far as the wet areas are concerned.

In order to be able to use all the fastening means in the seat rails for anchoring interior equipment components, the through-holes in the at least one floor panel are arranged along the regions by means of which the at least one floor panel rests on the individual seat rails. In this arrangement the through-holes can be arranged at regular spacing from each other so that they are flush with the fastening means in the seat rails situated underneath. For example, the through-holes can be arranged at a one-inch pitch in relation to each other so that they are spaced apart from each other by a multiple of one inch.

Since usually the attachment means in the seat rails are spaced three inches apart from each other, the through holes in the floor panel can, for example, be spaced apart from each other by three inches so that each of the attachment means of the seat rails can be used for anchoring interior equipment components. Of course, if required, the through-holes can also be spaced apart from each other only by a multiple of three inches, which may, for example, be advantageous for aesthetic reasons.

Because the floor panel as a continuous panel extends over several seat rails, so that certain savings in material in the floor panels can be achieved as a result of the continuous effect of the floor panels, if required the floor panels could be made from thinner material than is the case with the conventional floor structure. However, if relatively heavy interior equipment components are to be installed on the floor panel, it may become necessary to reinforce the floor structure with additional longitudinal support beams despite the through-support effect. To this effect, for example, an additional longitudinal beam can be integrated in the floor structure, which longitudinal beam extends parallel in relation to, and between, two conventional seat rails. This additional longitudinal beam is then used as an additional linear bearing for the floor panel. Since this additional linear bearing, too, can have the same profile as a conventional seat rail, it may be expedient to provide additional through-holes in the floor panel, which through-holes are arranged along the regions by means of which the at least one floor panel rests on the additional linear bearings in the form of a seat rail profile so that a galley or lavatory can also be anchored to these additional seat rails. Thus, this provides additional flexibility, within the respective floor panel, in relation to the possible arrangement positions of an interior equipment component so that an even more individual layout of the passenger cabin can be created.

While the dimensions of the floor panels of the floor structure according to the invention are larger than is the case in conventional floor panels that extend only between two seat rails, the dimensions of the floor panels of the floor structure according to the invention are also finite, which is why the two abutting edges of two adjacent floor panels are tightly sealed so that wet areas such as, for example, lavatories or galleys can be arranged or placed at any location in the interior of the aircraft cabin.

As shown above, the floor structure according to the invention makes it possible to implement extremely flexible positioning options of interior equipment components in an aircraft cabin because the arrangement of lavatories or galleys is no longer restricted to certain areas in which special sealing of the floor panels is provided, as is the case in conventional floor structures. Instead, galleys or lavatories can be arranged at almost any position in the interior of the aircraft, because there is no need to provide additional sealing of the joints between the floor panels and the seat rails.

Moreover, the floor structure according to the invention makes it possible to change the configuration more quickly so that the interior equipment components, seen in horizontal view, can be rearranged or displaced without major effort. In this way various cabin layouts can be implemented in short time, in that galleys or lavatories can be changed as desired from an original configuration to some other configuration, which may, for example, be due to special customer requirements.

Furthermore, in contrast to the previously described known floor structure, fewer floor panels of different sizes have to be kept; a factor which is due to standardisation of the floor panels that the floor structure according to the invention makes possible. According to a further aspect of the present invention an aircraft with a passenger cabin comprises a floor whose structure is designed as described in the above passages.

BRIEF DESCRIPTION OF THE DRAWINGS

Below, the invention is explained in an exemplary manner with reference to the enclosed drawings. It should be pointed out that the embodiments of the invention which are shown in the figures explain said invention purely by way of example and in particular must not be interpreted in any way as limiting the scope of protection of the invention. The following are shown.

Throughout all the drawings, the same or corresponding reference characters are used for identical or similar elements. The illustrations are not necessarily to scale, but they may indicate qualitative size relationships.

DESCRIPTION OF EXEMPLARY
EMBODIMENTS OF THE INVENTION

Figure 1:
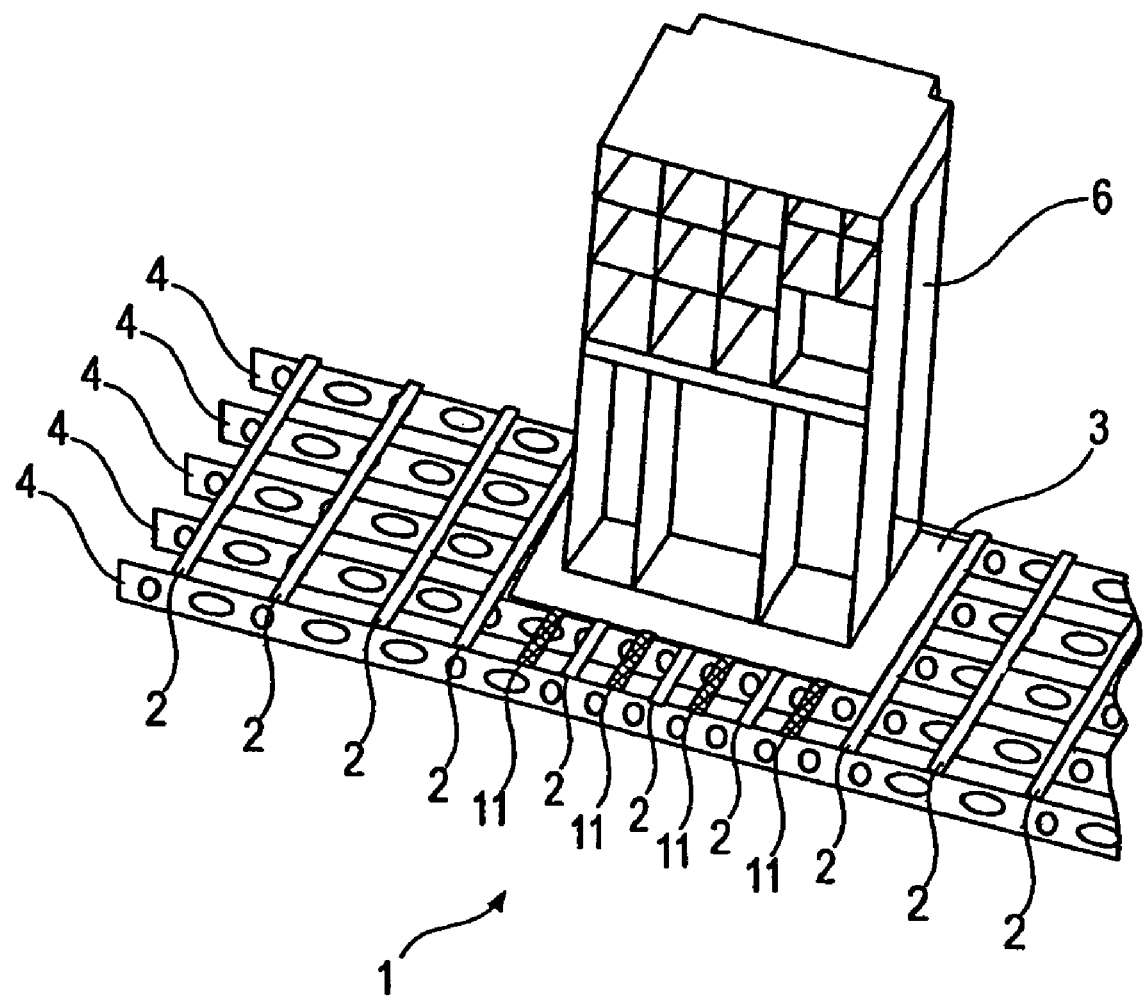
FIG. 1 shows a perspective view of a floor structure according to the invention, with a galley installed thereon.

FIG. 1 shows a section of a perspective view of the floor structure 1 according to the invention. As shown in the diagram, a plurality of transverse girders 4 extend parallel in relation to each other, in this way spanning the fuselage (not shown) of an aircraft, which fuselage is formed by a plurality of frames. The transverse girders 4 comprise a plurality of openings for the purpose of installing mechanical and electrical systems, which openings at the same time result in certain weight savings. On this primary support structure that is formed by the transverse girders 4, in longitudinal direction of the fuselage a plurality of seat rails 2 extend parallel in relation to each other, which seat rails 2 are normally used for fastening seats or groups of seats, as well as for locking into place interior equipment components such as, for example, galleys or lavatories.

As shown in FIG. 1, in the exemplary embodiment shown, ten seat rails extend so as to be equidistant from each other, which seat rails are used in the standard manner for accommodating seats. Furthermore, in the exemplary embodiment shown, four further seat rails 11 are arranged in the middle region, each seat rail 11 being arranged between two standard seat rails 2, with the purpose of the additional seat rails 11 being explained in more detail later on.

Apart from the seat rails 2 the floor structure according to the invention further comprises several floor panels 3, of which, however, only one is shown in FIG. 1. According to the invention the floor panels 3 extend over several seat rails 2 and are supported by the individual seat rails 2. Thus in FIG. 1 the floor panel 3 is supported by a total of five standard seat rails 2, wherein for better load support and to reduce deflection between the individual seat rails 2, further supports 11 are in place that, for example, can also comprise a seat rail profile in order to be able to fasten interior equipment components 6 therein too.

Since the floor panels 3 thus extend over the individual seat rails 2, thus covering up the seat rails 2 and in particular their fastening means, the floor panels 3 can comprise a plurality of through-holes 5 (not shown in FIG. 1), through which the interior equipment components 6 of the aircraft, in the diagram by way of example the galley 6, can be fastened to the seat rails.

As already shown in FIG. 1, the floor panel 3 is a continuous panel that extends over the standard seat rails 2 so that as a result of this through-support effect the tensile forces as well as the deflection of the floor panel 3 between the individual seat rails 2 can be kept to a minimum. In order to further reduce the tensile forces and the deflection caused by transverse forces or by bending moments, the exemplary embodiment shown in FIG. 1 comprises four further seat rails 11 between the middle five standard seat rails 2, as a result of which further seat rails 11 the tensile forces and deflection of the floor panel 3 caused by the weight of the galley 6 can be reduced.

Figure 2:
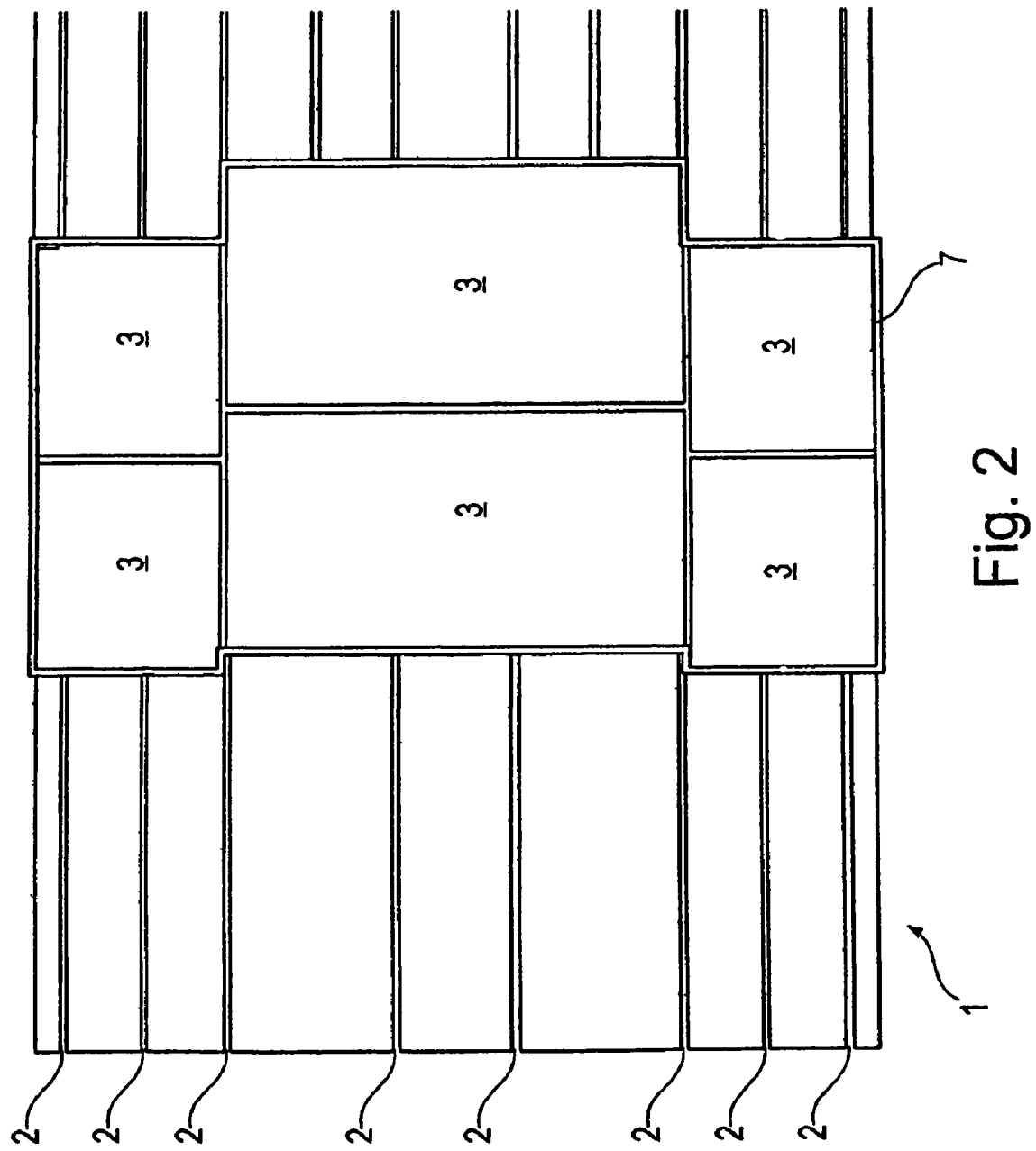
FIG. 2 shows a horizontal projection of the floor structure according to the invention, with several floor panels adjacent to each other.

FIG. 2 shows a horizontal projection of the floor structure 1 according to the invention, in which floor structure 1 several floor panels 3 are arranged so as to be offset in relation to each other. This diagram again shows that in the middle region wide floor panels 3 extend over several seat rails 2. In the outer region, smaller floor panels 3 are arranged on the seat rails 2 so as to be offset in relation to the floor panels 3 that extend in the middle region, wherein the respective floor panels 3 abut, with the locations of the joints being tightly sealed off. The six floor panels 3 shown in FIG. 2 define a wet area within which a galley 6 or lavatory 6 can be arranged at any desired fastening position along the longitudinal direction of the seat rails 2. To this effect the floor panels 2 comprise a plurality of through-holes 5 that are arranged along the regions by which the floor panels 3 are supported by the individual seat rails 2 so that the interior equipment components can be locked into place on the seat rails through these through-holes 5. The wet area in FIG. 2, which is formed by the six floor panels 3 shown, on the circumferential side is sealed off, by the outer edges of the floor panels 3, from the adjacent floor panels (not shown), as indicated in FIG. 2 by the circumferential edge 7 in the form of a dark line.

Figure 3A:
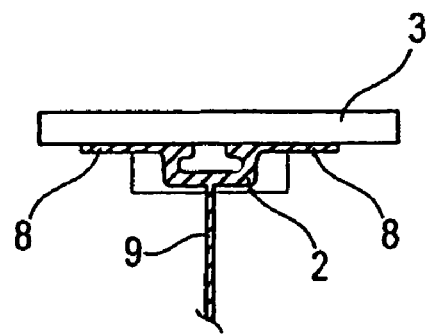
FIG. 3a-3c shows different designs of connection regions for interior equipment components on the seat rails.
Figure 3B:
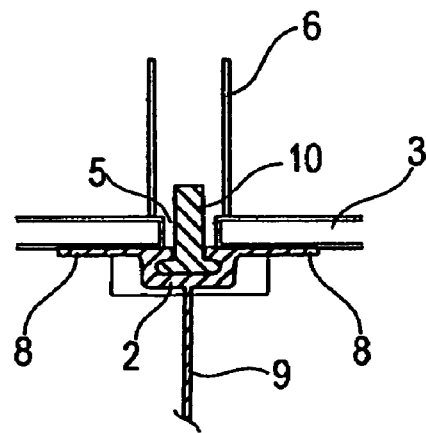
Figure 3C:
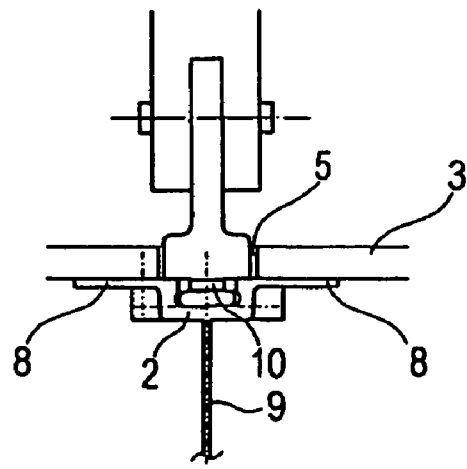

FIGS. 3a-3c show three different embodiments in the region of the support points of the floor panels 3 on the seat rails 2. As shown in FIG. 3a the seat rail 2 comprises a C-shaped profile, wherein in the support region of the floor panel 2 on each side a horizontal flange 8 has been formed. Furthermore, the C-shaped profile of the seat rail 2 is reinforced in vertical direction by a web 9, as a result of which web 9 deflection in vertical direction can be reduced. In the embodiment shown in FIG. 3a, the entire area of a floor panel 2 rests on the seat rail 2, and in particular on the horizontal flanges 8 of said seat rail 2, wherein, however, no through-apertures are provided in the floor panel 3 in the region of the seat rail.

In contrast to the above, in FIG. 3b the floor panel 3 in the region in which it rests on the seat rail 2 comprises a through-hole 5 through which an interior equipment component 6 can be anchored, as shown in FIG. 3b. This diagram shows the base of an interior equipment component 6, which engages the C-shaped profile of the seat rail 2 with form fit by means of an engagement means 10 in order to anchor in it the interior equipment component 6, for example a galley.

In the embodiment shown in FIG. 3c, too, the entire area of a floor panel 3 rests on a seat rail 2, wherein again in the region of the seat rail 2 a through-hole 5 is designed as a slot in the floor panel 3. In the embodiment shown in FIG. 3c, through this through-hole 5, a seat is anchored in the seat rail 2 by way of a corresponding fastening means 10 which anchors the base of the seat through the through-hole 5 in the C-shaped seat rail.

Figures 4, 5:
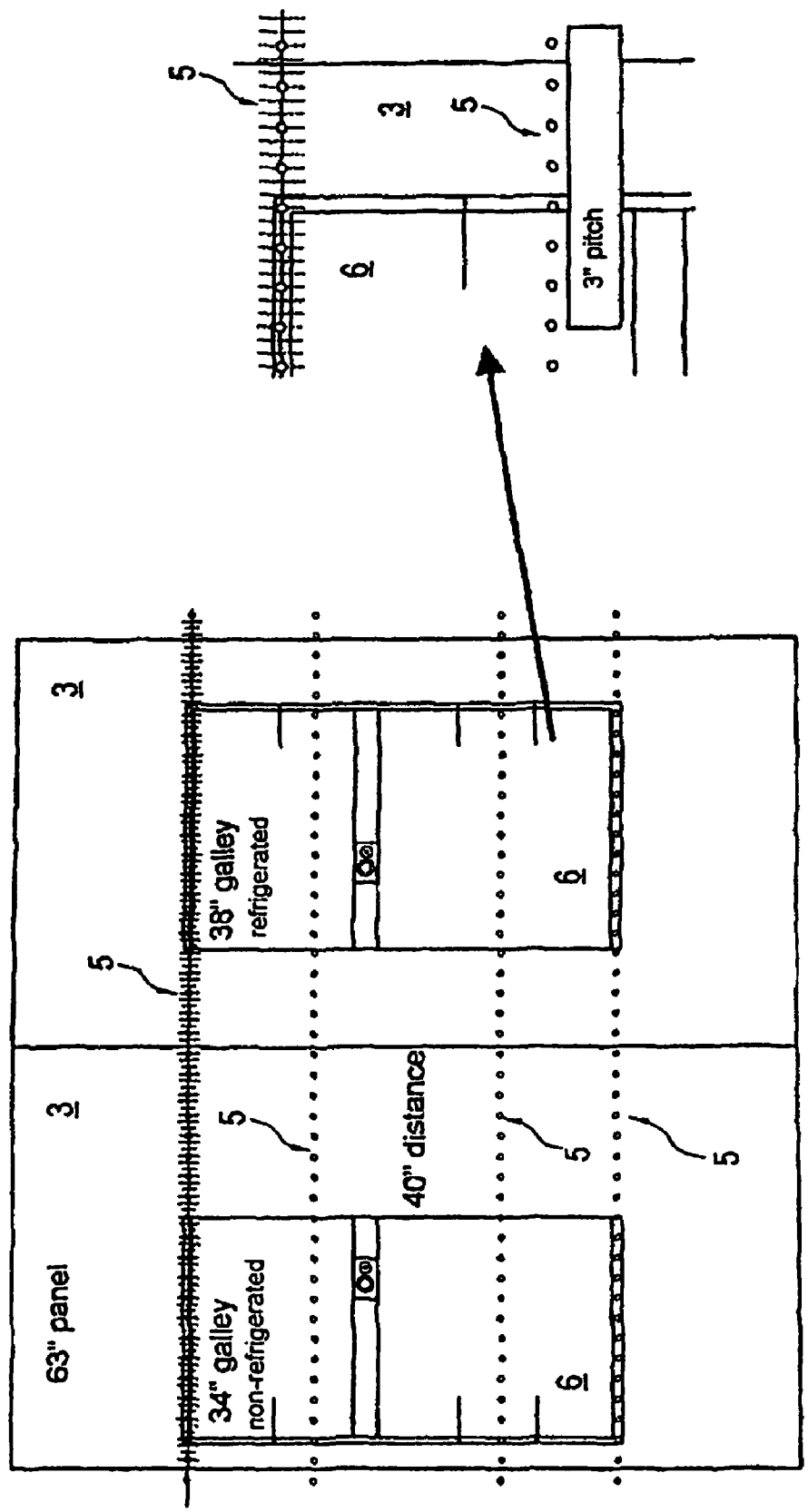
FIG. 4 shows a horizontal projection of an exemplary arrangement of two galleys.
FIG. 5 shows an enlarged section in the connection region of the galley shown in FIG. 4.

Below, an installed situation of two galleys 6 on the floor structure 1 according to the invention is explained with reference to FIGS. 4 and 5. In this arrangement FIG. 4 shows two directly adjoining floor panels 3. The two floor panels 3 rest on the seat rails 2 (not shown) which is indicated by the four rows of through-holes 5 that are arranged in the panels 3. In this arrangement the individual through-holes 5 can, for example, have a mutual spacing of 3 inches between each other, which is dictated by the spacing of the corresponding fastening means in the seat rails 2. On each of the two floor panels 3 in the embodiment shown in FIG. 4 a galley 6 is arranged, which can be fastened to either of the two floor panels 3, at any desired position, through the through-holes 5 in the seat rails 2 (not shown). In this arrangement the galleys 6 can be moved by the above-mentioned exemplary three-inch increments and thus can assume almost any spacing in relation to each other so that the cabin design can be designed in a very individual manner. In FIG. 4 the two galleys 6 are, for example, spaced apart by 40 inches by an intermediate aisle, which if required can be reduced to 37, 34, 31 or still fewer inches, or can be increased to 43, 46 or more inches. As clearly indicated in particular in FIG. 4, within the panel region of the individual panels 3 no seals whatsoever are required because the panels continuously extend over the seat rails. The above explanations are all based on an exemplary layout in which the through-holes 5 are arranged at a spacing of three inches in relation to each other; however, it should be noted that this pitch is only exemplary. Accordingly, pitches with two, four, five inch spaces or even larger spaces between holes are imaginable. Further, pitches with user-defined fractions of an inch are imaginable.

FIG. 5 finally shows a section of FIG. 3 in the corner region of a galley 6, wherein the fastening points of the galley 6 are more clearly shown, by means of which fastening points said galley 6 can be fastened at a 3-inch pitch to the floor panels 3 or to the seat rails 2 situated underneath them.

In addition, it should be pointed out that "comprising" does not exclude other elements or steps, and "a" or "one" does not exclude a plurality. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Floor structure
2 Seat rail
3 Floor panel
4 Transverse girder
5 Through-hole
6 Galley
7 Seal
8 Flange
9 Web
10 Engagement means
11 Additional seat rails

The invention claimed is:
1. A floor structure in an aircraft, comprising:
a plurality of transverse girders extending parallel in relation to each other;
a plurality of seat rails extending parallel in relation to each other and are arranged orthogonal with respect to the plurality of transverse girders; and
at least one floor panel;
wherein the at least one floor panel extends over the plurality of seat rails to rest on the individual seat rails of the plurality of seat rails; and
wherein the at least one floor panel comprises a plurality of through-holes arranged equidistantly along a line parallel to at least one of the seat rails through which through-holes interior equipment components of the aircraft can be locked into place on the seat rails.
2. The floor structure of claim 1,
wherein the at least one floor panel extends as a continuous panel over the plurality of seat rails.

3. The floor structure of claim 1,
wherein the through-holes in the at least one floor panel are arranged along regions in which the at least one floor panel is supported by individual seat rails.

4. The floor structure of claim 3,
wherein the through-holes are arranged at regular spacings from each other so that they are flush with fastening means in the seat rails.

5. The floor structure of claim 3,
wherein the through-holes are arranged at a one-inch pitch in relation to each other.

6. The floor structure of claim 3,
wherein the through-holes are spaced apart from each other by 3 inches.

7. The floor structure of claim 1, further comprising:
at least one linear bearing extending parallel in relation to, and between, first and second of the plurality of seat rails.

8. The floor structure of claim 7,
wherein the at least one linear bearing comprises a seat rail profile.

9. The floor structure of claim 1,
further comprising a second adjacent floor panel joined to the at least one floor panel on first and second abutting edges, at which first and second edges the floor panels are tightly sealed.

10. An aircraft with a passenger cabin comprising a floor structure, the floor structure comprising:
a plurality of transverse girders extending parallel in relation to each other;
a plurality of seat rails extending parallel in relation to each other and are arranged orthogonal with respect to the plurality of transverse girders; and
at least one floor panel;
wherein the at least one floor panel extends over the plurality of seat rails to rest on the individual seat rails of the plurality of seat rails; and
wherein the at least one floor panel comprises a plurality of through-holes arranged equidistantly along a line parallel to at least one of the seat rails through which through-holes interior equipment components of the aircraft can be locked into place on the seat rails.

\* \* \* \* \*